May 23, 1961   J. M. HOLAHAN, JR   2,985,402
SPOOL CONSTRUCTION
Filed Feb. 26, 1958

INVENTOR:
JOSEPH M. HOLAHAN, JR.
BY Howson & Howson
ATTYS.

2,985,402
SPOOL CONSTRUCTION

Joseph M. Holahan, Jr., Abington, Pa., assignor to True Temper Corporation, a corporation of Ohio Filed Feb. 26, 1958, Ser. No. 717,697

2 Claims. (Cl. 242—118.4)

The present invention relates to new and useful improvements in the construction of spools for fishing reels and the like and particulraly spools which might be subjected to relatively high stresses.

At the present time, in the fishing industry, nylon monofilament line has considerable popularity as fishing line and is in very wide use. When stretched nylon or monofilament line is wound on the spool of a fishing reel a tremendous pressure is built up on the spool flanges. This is particularly true when a relatively lightweight line for example a 6 pound test weight line, is used on the spool and is wound on the spool while it is under tension. This pressure on the spool flanges is created by each loop of the stretched nylon line acting as a spring exerting a cumulative force radially inward upon the spool hub. A spool, when fully wound, may contain thousands of convolutions of the line and when these convolutions or loops are stretched tightly about the spool, as would occur when reeling in a fish, the pressure exerted radially inward on the hub becomes so great that the inner loops of the line are forced axially outward toward the flanges of the spool thereby exerting a considerable amount of pressure on the flanges. In many instances, this axial pressure on the flanges of a spool have caused the flanges to break with such a sudden force that the end plates of the reel have been completely shattered. This phenomenon of tremendous pressure accumulation occurs both in conventional type reels and in spinning reels and may cause considerable damage to the reels.

With the foregoing in mind the principal object of the present invention is to provide a novel spool construction for fishing reels and the like which will successfully withstand a considerable axial force exerted on the spool flanges by tightly wound convolutions of nylon or monofilament line on the spools.

A further object of the present invention is to provide a novel reinforced flange construction for spools for fishing reels and the like wherein the spool flanges are securely fixed to the shaft of the spool.

A still further object of the present invention is to provide a novel spool construction having the features and characteristics set forth above which is of relatively simplified construction, may be manufactured easily and cheaply, and is entirely efficient and effective in operation and use.

These and other objects of the present invention and the various features and details of the construction thereof are hereinafter more fully set forth and described with reference to the accompanying drawings, in which.

Figure 1:
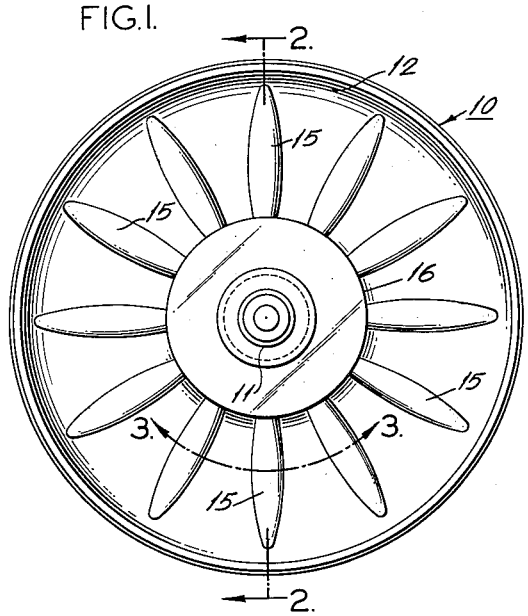
Fig. 1 is a side elevational view of a spool made in accordance with the present invention.
Figure 4:
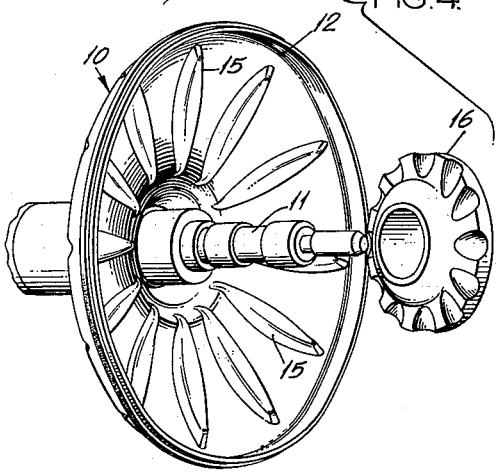
Fig. 4 is a perspective view of a spool flange and flange reinforcing washer of the spool of Fig. 1.

Referring more specifically to the drawings, reference numeral 10 designates generally a spool assembly made in accordance with the present invention comprising a stepped shaft 11 and a pair of similar spool segments 12, 12 secured to the shaft with each spool segment 12 having a partial hub portion 13 terminating at its outer end in a radially extending flange portion 14. The shaft 11 comprises a central cylindrical portion 11a terminating short of the radially extending flange portions 14, 14 in cylindrical portions 11b, 11b of reduced diameter which extend outwardly beyond the flange portions 14.

In accordance with the present invention, the spool flange portions 14, 14 are reinforced to strengthen the flanges and resist the high pressures built up by nylon or monofilament line wound tightly on the spool. This reinforcing is accomplished by providing a plurality of radial ribs 15 at regular intervals about the flanges projecting outwardly of the outer surface of the flanges and terminating inwardly of the inner and outer edges of the flanges.

Figure 2:
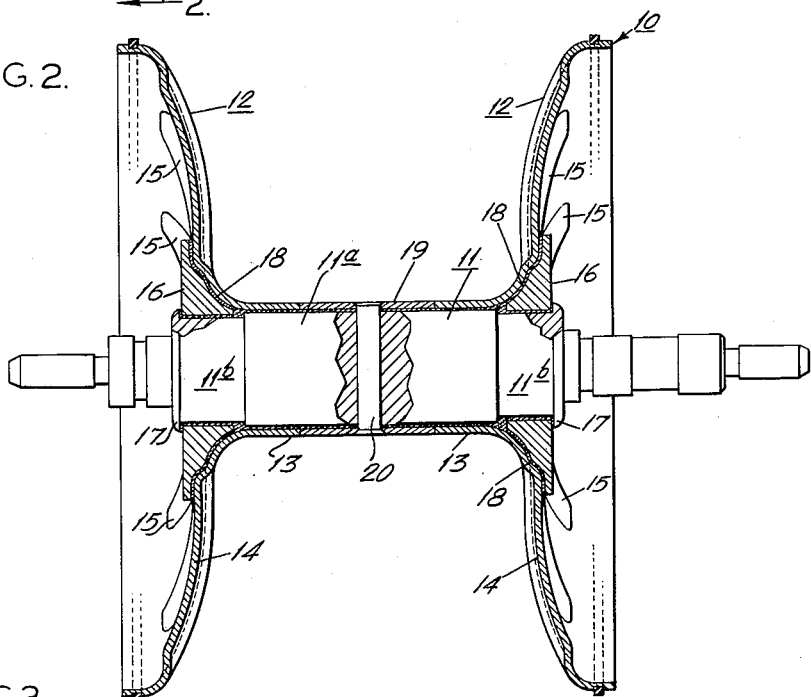
Fig. 2 is an enlarged longitudinal sectional view taken on line 2—2, Fig. 1.
Figure 3:
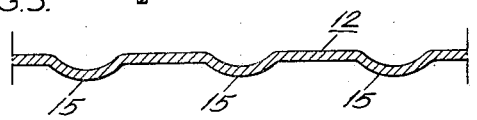
Fig. 3 is an enlarged fragmentary sectional view through a spool flange made in accordance with the present invention taken on the arcuate line 3—3, Fig. 1.

An important feature of the present invention is the provision of means to secure the spool segments 12, 12 to the shaft 11 and prevent the pressure built up by the tightly wound nylon or monofilament line from forcing the spool segments endwise off of the shaft 11. This is accomplished in the present invention by means of a pair of washer members 16, 16 which are secured to the reduced portions 11b, 11b of the shaft 11 in engagement with the outer surface of the spool segments 12, 12, for example as illustrated in Fig. 2. The washers 16, 16 are secured to the shaft reduced portions 11b, 11b by rolling or peening the terminal ends of the reduced portions of the shaft outwardly into engagement with the washers as illustrated at 17, 17. The inwardly facing surfaces of the washer members 16, 16 are shaped to correspond exactly to that portion of the outer surface of each spool segment engaged by the washers so that the washers engage and closely embrace the spool segments. By this construction, the washers, in addition to securing the spool segments in position on the shaft, also support and strengthen the outer end of the hub portions of the spool segments and the inner portions of the flanges.

According to the present invention, the inner diameter of the partial hub portions of the spool segments is slightly greater than the external diameter of the central cylindrical portion 11a of the shaft 11 and the spool segments, and the washers are adhesively bonded to one another and to the shaft by means of a suitable adhesive positioned between the washers, spool segments, and shaft. Any desired high strength adhesive compound may be used for this purpose such as organic compounds and polymeric materials that adhere to metal surfaces and plastic surfaces which are well known and include the thermosetting condensation polymers, such as phenol-aldehyde resins, epoxy resins, polyester resins, triazine resins and others. The adhesive bond between the washers, spool segments, and shaft serves to further strengthen the spool assembly. As illustrated in the drawings, the adhesive bond represented by numeral 18, extends entirely along the portions 11a and 11b of the shaft from the inner ends of the spool segments to the outer ends of the washers, and also is positioned between the mating surfaces of the washers and spool segments.

In the illustrated embodiment of the present invention, the spool segments 12, 12, do not extend entirely to the center of the shaft 11 but a spacer member 19 is positioned about the central portion of the shaft 11 intermediate the spool segments. In addition to the adhesive bond, this spacer member may be secured to the shaft 11, for example by means of a hollow rivet 20 which extends diametrically through the spacer member and the central portion of the shaft. However, in narrower spools it might not be necessary to use this spacer member and the spool can be assembled with the two segments 12, 12 in contact with one another.

From the foregoing, it will be apparent that the present invention provides a novel spool construction for fishing reels and the like of relatively simplified construction having reinforced flange portions capable of withstanding the tremendous pressures built up by tightly wound nylon or monofilament line. In addition, it will be apparent that the present invention provides a novel spool construction wherein the various elements of the spool including the hub portion flanges and reinforcing washers are rigidly secured to the shaft to prevent the spool from coming apart upon the application of extremely high pressures or forces thereon.

While particular embodiments of the present invention have been illustrated and described herein it is not intended to limit the invention to such a disclosure and changes and modifications may be incorporated and embodied therein within the scope of the following claims.

I claim:

1. A spool for fishing reels and the like comprising; a central drive shaft having a mid-portion thereon of generally cylindrical shape, a spool hub portion positioned about the mid-portion of said drive shaft, a pair of oppositely disposed radially extending spool side flanges at opposite ends of said hub portion, said side flanges merging with said central hub portion in a smooth radius at the inner ends of said side flanges providing an arcuate junction between the side flanges and hub portion, said spool side flanges each having a plurality of radially extending ribs formed integrally therewith projecting laterally outwardly beyond the outer side walls of said flanges, said ribs starting at the outer periphery of the arcuate junction between the spool side flanges and the central hub portion and extending radially outward therefrom and terminating short of the outer periphery of the spool side flanges, a reinforcing washer carried by said central drive shaft positioned outwardly adjacent each of said spool side flanges and extending radially outward beyond the hub portion of said spool and beyond the inner ends of said reinforcing ribs, said reinforcing washers having a central portion conforming to and in engagement with the arcuate junctions between the spool hub portion and the spool side flanges and an outer portion having radially extending recesses therein conforming to and in engagement with the ribbed portion of the spool side flanges, and means securing said reinforcing washers to said spool with the washers in pressure applying relation with said spool side flanges.

2. Apparatus in accordance with claim 1 wherein an adhesive bond is provided between said reinforcing washers, flanges, hub portion and shaft.

References Cited in the file of this patent

UNITED STATES PATENTS

| | | |
|---|---|---|
| 151,200 | Bryant | May 26, 1874 |
| 1,949,378 | Roehm | Feb. 27, 1934 |
| 2,267,126 | Moretti | Dec. 23, 1941 |
| 2,282,156 | Benes | May 5, 1942 |
| 2,309,146 | Whistler | Jan. 26, 1943 |
| 2,344,132 | Coxe | Mar. 14, 1944 |